March 4, 1930.  T. V. BUCKWALTER  1,748,971
PROCESS OF MOUNTING ROLLER BEARINGS ON CAR AXLES
Original Filed Nov. 21, 1927
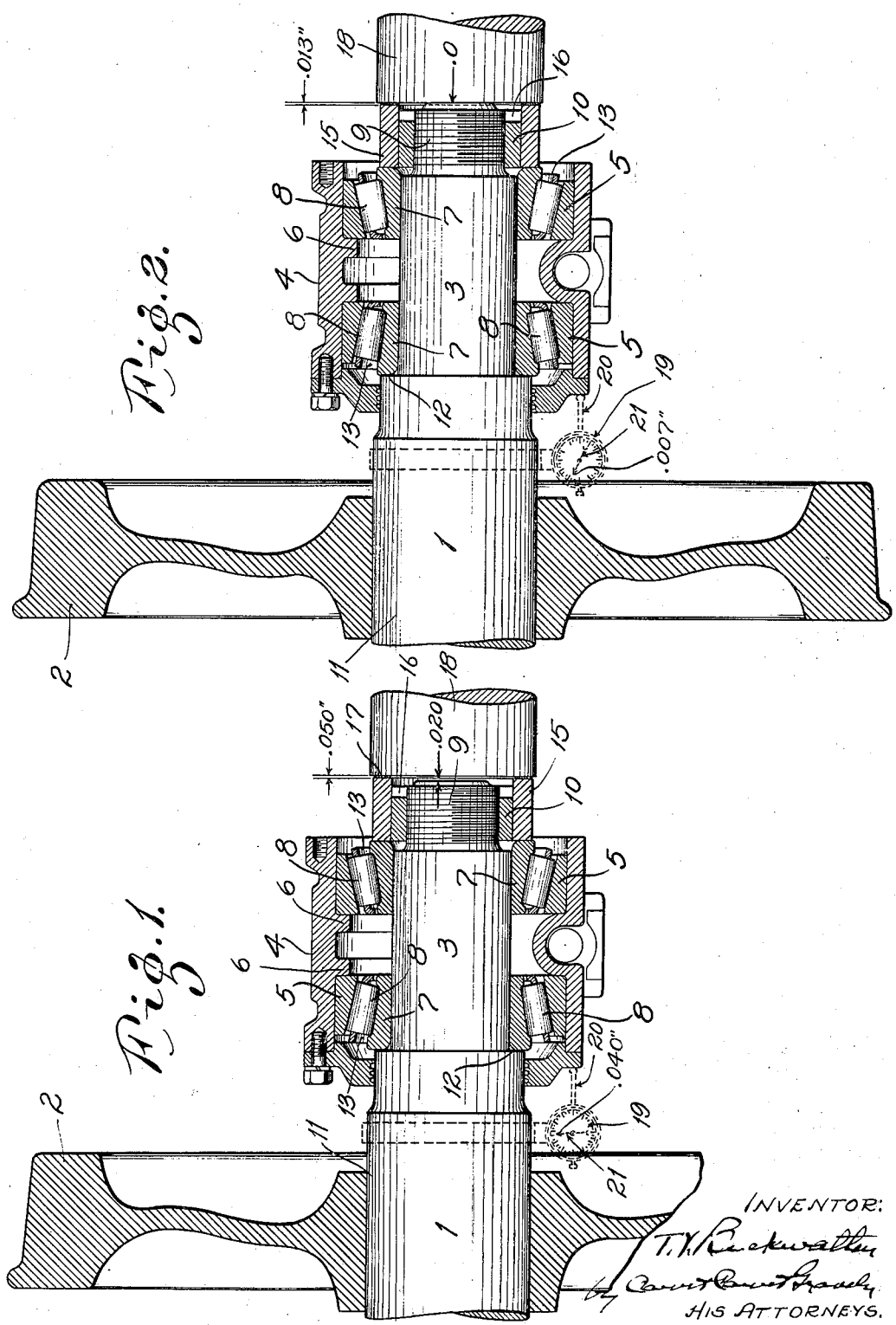
INVENTOR:
T. V. Buckwalter
HIS ATTORNEYS.

Patented Mar. 4, 1930

1,748,971

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

PROCESS OF MOUNTING ROLLER BEARINGS ON CAR AXLES

Application filed November 21, 1927, Serial No. 234,634. Renewed November 2, 1929.

There are numerous well known reasons that make it desirable to interpose roller bearings between the journal portions of car axles and the journal boxes; but heretofore it has been difficult to assemble the parts of a roller bearing suitable for such heavy duty with the precision required. The purpose of the present invention is to devise a process that makes it practicable to assemble such bearing parts with the required precision. The invention consists in the process hereinafter set forth.

In the accompanying drawing wherein like reference numerals indicate like parts wherever they occur.

Fig. 1 is a longitudinal sectional view of an axle construction in its semifinal stage of assembly, with the ram of the press at the limit of its stroke; and Fig. 2 is a similar view of the axle at the end of its final stage of assembly, with the ram of the press at the limit of its stroke and with a shim interposed between said ram and the distance sleeve that abuts against the outer bearing cone.

It is common practice to press-fit car wheels on their axles; and Fig. 1 of the drawing illustrates a car axle 1 with the wheels 2 press-fitted thereon and with the journal portions 3 between the respective wheels and the adjacent ends of the axle. In lieu of the journals of the ordinary axle, that fit in ordinary journal boxes, the present axle adapts each of the journal boxes to receive two conical bearing cups 5 whose large ends abut against an annular rib 6 provided therefor in the inside of the journal box or housing 4. Each end of the axle 1 is provided with two cones 7 or inner bearing members corresponding to their respective cups or outer bearing members 5, and a circular series of taper rollers 8 are interposed between each cup 5 and the corresponding cone 7. Each end 9 of the axle beyond the journal portion 3 is reduced in diameter and threaded to receive a nut 10 that is of sufficient diameter to abut endwise against the large end of the cone 7 of the outer bearing.

On account of their size and the heavy duty to which such roller bearings are subjected in service and the resulting necessity of making them heavier and stronger than roller bearings in other relations, the usual practices of assembling and adjusting roller bearing parts are practically inapplicable. This is particularly true on account of the need for a heavy press-fit of the outer bearing cone 7 on the axle and the inability to adjust such cone after it leaves the hydraulic press.

According to the present invention, the diameter of the journal portion 3 of the axle is less than that of the wheel seat 11, and the inner of the two bearing cones 7 beyond such wheel seat 11 is press-fitted on such journal and forced home against the shoulder 12 formed by the reduction of the diameter of the axle. The cage 13 and rollers 8 are then slipped over the end of the axle, and the journal box or housing 4 with the cup of such inner bearing fitted in its inner end is also slipped over the end of the axle, whereby the parts of the inner bearing are brought into proper relation to one another. The cup 5 of the outer bearing is fitted into the outer end of the journal box 4 or housing either before or after (preferably before) the said housing is slipped on to the axle. The other cage 13 and rollers 8 are then slipped over the end of the axle and the outer bearing cone is press-fitted on the axle and forced endwise thereon to the precise position required.

The operation of mounting the outer cone 7 on the axle is as follows: The axle 1 is placed in a hydraulic press with the several parts, except the outer bearing cone, assembled thereon. The outer bearing cone 7 is then slipped over the end of the axle with its smaller end started onto the journal portion 3 of the axle. A dummy nut 10 is then screwed onto the threaded end 9 of the axle and a distance sleeve 15 is slipped over said dummy nut. The dummy nut preferably has a cylindrical surface and a castellated outer end 16, and is shorter than the distance sleeve 15, which has a sliding fit thereon. The length of the distance sleeve 15 is equal to or slightly less than the distance from the plane of the end face of the axle 1 to the plane of the back face of the outer bearing cone 7 when said bearing cone is in its adjusted position. Thin annular shims 17 of known thickness are interposed between the outer end of the distance sleeve and the face of the ram 18, and the ram is then operated until the face thereof abuts against the end of the axle. This movement of the ram 18 is transmitted through the shims 17 and distance piece 15 to the outer bearing cone 7 which is thereby forced along the axle to a position somewhat short of its final adjustment. The extent of looseness of adjustment is then determined by measuring the play or extent of movement of the housing lengthwise of the axle, say, for sake of illustration, about forty-thousandths of an inch. As proper adjustment requires a slight play of the housing endwise of the axle, say, for sake of example, seven-thousandths of an inch, the proper adjustment of the outer bearing requires it to be moved lengthwise an amount equal to the total amount of its endwise play minus the amount of play desired for the final adjustment. In the given case, this amount is forty-thousandths of an inch minus seven-thousandths of an inch, that is to say, thirty-three-thousandths of an inch. Accordingly, the shims used for the preliminary adjustment of the cone are replaced with shims having an aggregate thickness of thirty-three-thousandths of an inch more than the original shims; or shims of an aggregate thickness of thirty-three-thousandths of an inch are added to the original lot. The ram is then operated again and the outer bearing cone is thereby forced forward thirty-three-thousandths of an inch further and thereby brought into its permanent position of adjustment.

A convenient way of making the measurements above mentioned is to strap a dial indicator 19 on the axle inwardly of the housing with a radially movable bar 20 extending parallel with the axle and operatively connected to an arm 21 that swings over the face of the dial. The difference between the readings of the swinging arm with the housing at its inner and outer positions gives the play of such housing.

The drawing illustrates a construction wherein each end of the axle is equipped with two series of taper rollers that taper towards each other. Obviously, the process is applicable to a construction wherein each end of the axle is equipped with a single series of taper rollers, with the rollers of each series tapering toward the rollers of the other series. In such case, the truck construction joins the housings for the two ends of the axle together so as to function after the manner of the single housing 4 illustrated in the drawing.

What I claim is:

1. The process of providing a car axle with taper roller bearings, which comprises press-fitting on said axle a bearing cone that tapers towards a second bearing cone hereinafter mentioned, slipping onto said axle bearing cups that are relatively fixed and have taper rollers between them and said cones respectively, slipping onto the axle said second bearing cone tapering toward said first mentioned cone, slipping over the end of the axle a sleeve adapted to bear against the end of said second cone and with shims interposed between said sleeve and the ram of a press, moving said ram until it bears against the end of the axle, measuring the play of the cups, increasing the thickness of the shims by an amount equal to the excess play of the cups, and again moving the ram into contact with the end of the axle whereby said second cone is forced endwise of said axle and the parts properly adjusted.

2. The process of providing a car axle with taper roller bearings interposed between said axle and the journal box, which consists in press-fitting on said axle a bearing cone that tapers outwardly, slipping over the end of said axle a housing with bearing cups seated therein and with rollers between said first mentioned cone and the inner bearing cup, slipping an inwardly tapering cone over the end of the axle with rollers interposed between it and the outer bearing cup, interposing shims between said cone and the ram of a press, forcing said last mentioned cone to a position short of proper adjustment with said cone until it brings up against the end of the axle, measuring the play of the housing, increasing the thickness of the shims by an amount equal to the excess play of the housing, and again moving the ram into contact with the end of the axle whereby the outer cone is forced endwise of said axle and the parts properly adjusted.

3. The process of providing a car axle with taper roller bearings interposed between said axle and the journal box, which consists in press-fitting on said axle a bearing cone that tapers outwardly, slipping over the end of said axle a housing with bearing cups seated therein and with rollers between said first mentioned cone and the inner bearing cup, slipping an inwardly tapering bearing cone over the end of the axle with rollers interposed between it and the outer bearing cup, slipping a sleeve over the end of the axle with shims interposed between said sleeve and the ram of a press, moving said ram until it bears against the end of the axle, measuring the play of the housing, increasing the thickness of the shims by an amount equal to the excess play of the housing, and again moving the ram into contact with the end of the axle whereby the outer cone is forced endwise of said axle and the parts properly adjusted.

4. The process of providing a car axle with taper roller bearings interposed between said axle and the journal box, which consists in press-fitting on said axle a bearing cone that tapers outwardly, slipping over the end of said axle a housing with bearing cups seated therein and with taper rollers between said first mentioned cone and the inner bearing cup, slipping an inwardly tapering bearing cone over the end of the axle with taper rollers interposed between it and the outer bearing cup, slipping a sleeve over the end of the axle with shims interposed between said sleeve and the ram of a press, moving said ram until it bears against the end of the axle, measuring the play of the housing, increasing the thickness of the shims by an amount equal to the excess play of the housing, and again moving the ram into contact with the end of the axle whereby the outer cone is forced endwise of said axle and the parts properly adjusted.

5. The process of providing a car axle with taper roller bearings, which comprises press-fitting on said axle a bearing cone that tapers towards a second bearing cone hereinafter mentioned, slipping onto said axle bearing cups that are relatixely fixed and have taper rollers between them and said cones respectively, slipping onto the axle said second bearing cone tapering toward said first mentioned cone, slipping over the end of the axle a sleeve adapted to bear against the end of said second cone, measuring the endwise play of the cups in the position of the sleeve thus established, placing opposite the outer end of said sleeve shims of a thickness equal to the excess play of said cups, and moving a ram against said shims until its face reaches the plane occupied by said outer end of said sleeve when said measurement was made, said axle being meanwhile held in fixed position.

6. The process of providing a car axle with taper roller bearings, which comprises press-fitting on said axle a bearing cone that tapers towards a second bearing cone hereinafter mentioned, slipping onto said axle bearing cups that are relatively fixed and have taper rollers between them and said cones respectively, slipping onto the axle said second bearing cone tapering toward said first mentioned cone, slipping over the end of the axle a sleeve adapted to bear against the end of said second cone, moving a ram against said sleeve to a predetermined position, measuring the endwise play of the cups in the position of the sleeve thus established, interposing between said sleeve and said ram shims of a thickness equal to the excess play of said cups, and again moving said ram to said predetermined position, said axle being meanwhile held in fixed position.

Signed at Canton, Ohio, this 10th day of Nov., 1927.

TRACY V. BUCKWALTER.